United States Patent
Wang et al.

(10) Patent No.: US 7,051,262 B2
(45) Date of Patent: May 23, 2006

(54) METHOD FOR PROCESSING ERROR CODE OF COMPRESSED IMAGE IN TRANSMISSION

(75) Inventors: Jing Wang, Shenzhen (CN); Zhen Chen, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 69 days.

(21) Appl. No.: 10/250,620

(22) PCT Filed: Jan. 9, 2002

(86) PCT No.: PCT/CN02/00008

§ 371 (c)(1),
(2), (4) Date: Jul. 3, 2003

(87) PCT Pub. No.: WO02/056601

PCT Pub. Date: Jul. 18, 2002

(65) Prior Publication Data

US 2004/0059983 A1 Mar. 25, 2004

(30) Foreign Application Priority Data

Jan. 10, 2001 (CN) ............................. 01100546 A

(51) Int. Cl.
*H03M 13/00* (2006.01)
*G11C 29/00* (2006.01)

(52) U.S. Cl. .................. 714/758; 714/799; 714/48; 714/776

(58) Field of Classification Search ........... 714/747, 714/752, 758, 776, 799, 48
See application file for complete search history.

(56) References Cited

U.S. PATENT DOCUMENTS

| | | | |
|---|---|---|---|
| 5,617,333 A | 4/1997 | Oyamada et al. | ........... 364/514 |
| 5,862,451 A | 1/1999 | Grau et al. | ................. 455/5.1 |
| 6,078,616 A | 6/2000 | Ozcelik et al. | ............. 375/240 |
| 6,081,551 A * | 6/2000 | Etoh | .......................... 375/240 |
| 6,658,153 B1 * | 12/2003 | Nakagawa et al. | ........ 382/233 |

FOREIGN PATENT DOCUMENTS

| | | |
|---|---|---|
| CN | 1179252 A | 4/1998 |
| CN | 1256048 A | 6/2000 |
| JP | 8-37601 A | 2/1996 |

OTHER PUBLICATIONS

International Search Report for PCT/CN02/00008; ISA/CN; Mailed: Apr. 25, 2002.

* cited by examiner

*Primary Examiner*—Guy Lamarre
*Assistant Examiner*—Esaw Abraham

(57) ABSTRACT

A method for processing error codes in compressed encoded images transmission is disclosed. In this method, when error codes have been detected at the receiving end, the image code stream data with error codes is discarded before decoding the image code stream data, and the discarded image code stream data is replaced with the image code stream data located at the corresponding location of the previous frame, and image code stream data is decoded continually. More preferably, the method further comprises: setting a mark array for the image code stream data before decoding at the receiving end to record the locations where error codes have been detected. With this method, sending intra-frame images at transmitting end and freezing images at receiving end are avoided or their occurrence times is reduced, so image quality is thus improved.

7 Claims, 1 Drawing Sheet

| GOB1 | GOB2 |
|------|------|
| GOB3 | GOB4 |
| GOB5 | GOB6 |
| ⋮ | ⋮ |
| GOB11 | GOB12 |

| MB1 | MB2 | MB3 | ----- | MB11 |
|-----|-----|-----|-------|------|
| MB12 | MB13 | MB14 | ----- | MB22 |
| MB23 | MB24 | MB25 | ----- | MB33 |

Fig.1

| GOB1 | GOB2 |
|------|------|
| GOB3 | GOB4 |
| GOB5 | GOB6 |
| ⋮ | ⋮ |
| GOB17 | GOB18 |

| MB1 | MB2 | MB3 | ----- | MB11 |
|-----|-----|-----|-------|------|
| MB12 | MB13 | MB14 | ----- | MB22 |

Fig.2

METHOD FOR PROCESSING ERROR CODE OF COMPRESSED IMAGE IN TRANSMISSION

FIELD OF THE TECHNOLOGY

The invention relates to image transmission field in multimedia communication, especially to a method for processing error codes produced in compressed encoded images transmission.

BACKGROUND OF THE INVENTION

The image transmission technology, especially the technology on transmitting the compressed encoded images, has been wildly used in videoconferences and videophones. In real-time bi-directional video communication, such as videoconference, the video information is compressed into code stream data for transmission according to international standards. H.26X standards proposed by ITU-T, such as H.261 and H.263, are common ones used for encoding images at present. In the H.26X standards, the format of digital video is defined as Common Intermediate Format (CIF) and Quarter Common Intermediate Format (QCIF) that are unified image formats for videoconferences. These image formats can be used in different international television standards, such as PAL, NTSC and SECAM etc.

Taking the CIF format as an example, the structure of digital video formats defined in the H.26X standards will be briefly described. FIG. 1 and FIG. 2 respectively show the constitution of the H.261 CIF format and the H.263 CIF format. As shown in FIG. 1 and FIG. 2, each image frame is divided into multiple Groups of Blocks (GOBs), and each GOB is divided into multiple macro-blocks (MB). The MB can be divided further, but since it does not relate to the present invention, it will not be further described. In accordance with the image formats, code stream data of a compressed encoded image formed according to the H.26X standards is arranged into multiple layers during transmission. Among these layers, the image layer consists of an image layer header and data in the GOB layer, the GOB layer consists of a GOB layer header and data in the MB layer, the MB layer consists of a MB layer header and data in the next layer, and so on. Since the redundancy of a compressed code stream is low, the image quality at the receiving end is greatly affected by transmission channel error codes produced in transmission.

In general, an error code detection manner is used at the receiving end, such as the Forward Error Correction (FEC). When an error code is detected, the displaying image at the receiving end is frozen, namely, the process of decoding image data to video data which can be broadcast directly is paused. At the same time, a FastUpdate command is sent from the receiving end to the transmitting end through conference control. After receiving the FastUpdate command, the transmitting end encodes the current frame through encoding within frame and sends the encoded frame, and sets the location of Freeze Release bit in code streams as validness. After detecting the location of Freeze Release bit in code streams is set as validness, the receiving end cancels display freezing, and decodes image data to video data which can be broadcast directly continually.

The disadvantage of the prior art is that even there are few error codes, freezing images and intra-frame encoded images with low quality will frequently appear during decoding image data. Especially in a multipoint videoconference, when a terminal is broadcasting, if error codes appeared in lines of a certain receiving terminal, intra-frame encoded images with low quality will frequently appear in all of the terminals used in the videoconference owing to the above-mentioned processing manner for error codes. Usually, this is unacceptable for users.

SUMMARY OF THE INVENTION

It is an object of the invention to provide a method for processing error codes in transmitting compressed encoded images. With this method, it can be achieved to avoid transmitting intra-frame images at the transmitting end and freezing images at the receiving end or reduce their occurrence times. In this way, the quality of images can be improved.

To achieve this object, a method according to the present invention comprises: when having detected error codes at the receiving end, discarding the image code stream data with error codes before decoding image code stream data, and replacing the discarded image code stream data with the image data located at the corresponding location of the previous frame, then decoding image code stream data continually.

More preferably, the method further comprises: setting a mark array for the image code stream data before decoding at the receiving end to record the locations where error codes have been detected.

More preferably, the image code stream data with error codes to be discarded before decoding the image code stream data at the receiving end is the data in GOB with error codes under the condition that the image encoding standard is H.261.

More preferably, the step of discarding the image code stream data with error codes before decoding image code stream data under the condition that the image encoding standard is H.263 comprises:

if error codes have been detected in the first GOB of a frame, discarding all data in the whole frame; or if error codes have been detected in a certain GOB other than the first GOB of a frame, and if the GFID of the GOB with error codes is identical with the GFID of the next GOB, discarding data in the GOB with error codes; or if error codes have been detected in a certain GOB other than the first GOB of a frame, and if the GFID of the GOB with error codes is not identical with the GFID of the next GOB, backwardly searching the next frame header at the receiving end, and discarding all data between a starting position of the GOB with error codes and a starting position of the next frame header.

More preferably, the method further comprises: setting a fixed number of MBs in each frame to an intra-frame encoding mode at the transmitting end, and making said MBs of adjacent frames be adjacent in position on the screen.

More preferably, the number of MBs which are set to the intra-frame encoding mode in each frame for CIF images is three, and the number of those for images with other formats can be proportionally adjusted according to the size of images.

More preferably, different processing principles are applied for more error codes situation and less error codes situation. When there is more error codes situation, a special image is outputted at the receiving end.

Compared with the prior art, the actual requirements of users and the actual situation of videoconference has been considered more in the present invention, so it can be achieved to avoid transmitting intra-frame images at the transmitting end and freezing images at the receiving end or reduce their occurrence times with the present invention. Since scenes of a conference have few changes, the error codes can be well concealed and the quality of images is thus improved.

BRIEF DESCRIPTION OF THE DRAWINGS

FIG. 1 shows the constituent structure of the H.261CIF format.

FIG. 2 shows the constituent structure of the H.263CIF format.

DETAILED DESCRIPTION OF THE INVENTION

The invention will be described in more detail hereinafter, with reference to the accompanying drawings and embodiments.

In the prior art, the receiving end immediately freezes the displaying images after detecting error codes, and sends a FastUpdate command to the transmitting end through the conference control. When receiving the command, the transmitting end immediately encodes the current frame through encoding within frame and sends it, and sets the Freeze Release bit in the code stream as validness. After detecting the location of Freeze Release bit is set as validness, the receiving end releases the frozen displaying images. With this method for processing error codes, even there are few code errors, freezing images and intra-frame encoded images with low quality will frequently appear during decoding image data, which dissatisfies the users.

The inventors of the present invention recognize that because the scenes change quite few during a videoconference or a videophone communication, the data with error codes can be replaced with the data located at the same location of the previous frame in many circumstances, without the need of freezing the image and retransmitting the data. With this processing method, the quality of images at the receiving end can be improved, and it is more acceptable for users than the prior art.

In a preferred embodiment of the invention, the received code stream at the receiving end is first checked by CRC (Cyclic Redundancy Check). Then the video data is transferred to the video decoding layer through a video-receiving buffer. The video data in the video-receiving buffer is FEC frame data. After the data has been checked and its frame formats have been taken out by the decoder, pure image code stream data is extracted from the data. The pure image code stream data is put in a pure code stream buffer waiting for decoding. In this preferred embodiment, a mark array used for recording location where error codes have been detected is set for the pure code stream buffer. The mark array may correspond with the pure code stream buffer one element by one element. This means that length of the mark array equals to length of code stream data in the pure code stream buffer, and each element value of the mark array shows whether the corresponding bit of the code stream data is an error code.

In this embodiment, the error codes situations can be divided into two categories: more error codes situation and less error codes situation, and they are processed respectively.

For few error codes situation, error detection is first made with the FEC method which is recommended by the H.261 and H.263 standards. If there are error codes, the FEC frame is discarded, and the corresponding location of the mark array is marked with a sign representing an error code.

When processing a pure code stream data without the FEC frame, first check whether there is any sign representing an error code in the mark array. If there is no error code mark, directly send the data to the code stream decoding module. If there is an error mark or there are error marks, it is need to perform a processing for discarding data. When the H.263 standard is used, this processing comprises the following three steps:

A. determining the sequence number of GOB where the error codes have been detected and the starting position of the GOB in the buffer, which can be done by forwardly searching the GOB header;

B. if the GOB is the first GOB of a frame, then backwardly searching the frame header of the next frame and discarding all data in the whole frame where the error codes have been detected; and C. if the GOB is not the first GOB of a frame, forwardly searching the frame header of the previous GOB and recording the GFID, meanwhile backwardly searching the frame header of the next GOB and recording the GFID; if these two GFIDs are identical, discarding data in the GOB with error codes; otherwise backwardly searching the frame header of the next frame and discarding all data between the starting position of the GOB with error codes and that of the next frame header. The above-mentioned GFID is a mark bit defined in the H.263 standard; it represents the sequence number of the frame where the GOB is located. If two GFIDs are different, it shows the two GOBs are located at different frames. In contrast, if two GFIDs are identical, it shows the two GOBs are located at the same frame.

When the H.261 standard is used, the processing for discarding data is implemented as follow. Determine the starting position of the GOB where the error codes have been detected and the starting position of the next GOB in the buffer, and discard all data between these two starting positions. This can be done by forwardly and backwardly searching the GOB headers.

After discarding data has been done, error covering is done at the decoding end, namely, the discarded image data is replaced with the corresponding data in the previous frame.

After the above-mentioned processing, since the scenes of a videoconference have few changes, the few error codes can be well covered. But when an image has a large moving object, after said processing, the moving part will remain an obvious trial. A forced intra-frame block encoding method can be applied to eliminate the trail expansion. For a CIF image, no matter the original encoding mode is an inter-frame encoding mode or a mode without encoding, forcibly make three MBs of every frame apply the intra-frame encoding mode. The three MBs of a frame can be adjacent in position, such as the three MBs are sited one by one in a row, in a column, or in an orthogonal line. The three MBs can be separate in position also, but the three MBs of the present frame should be adjacent with those of the previous frame in screen position. For example, the three MBs of the current frame are selected according to those of the previous frame with the increasing or decreasing MB sequence number. Since the error expansion of an image always happens in adjacent MBs, trial expansion is more effectively eliminated by sequential mode than random mode.

For more error codes situation, even a processing has been made, the image quality is still bad. In this case, a special image is outputted, such as a blue screen with captions showing that there existed error codes.

Compared with the prior art, the real requirements of users and the actual situation of videoconference has been considered more in the present invention, so it can be achieved to avoid freezing images at the receiving end or reduce their occurrence times with the present invention. Since scenes of a conference have few changes, the error codes can be well concealed and the quality of images is thus improved.

Although the present invention has been described with reference to specific exemplary embodiments, it will be evident that various modification and changes can be made to these embodiments without departing from the broader spirit of the invention as set forth in the claims. Accordingly, the specification and drawings are to be regarded in an illustrative sense rather than in a restrictive sense.

The invention claimed is:

1. A method for processing error codes of a compressed encoded image transmission on a receiving end, comprising:
   providing a processor for receiving and processing a compressed image code stream, wherein the processor is responsible for:
   a) implementing an error code check on the image code stream
   b) discarding a selected portion of image data within a frame determined to have errors; and
   c) replacing the discarded image data with corresponding data from a previously processed frame that was determined to be error free.

2. The method of claim 1, further comprising:
   setting a mark array for the image code stream to record the locations where error codes have been detected.

3. The method of claim 1, wherein the image encoding standard is H.261 and wherein the selected portion of image data with error codes to be discarded is the data in a Group of Blocks (GOB) with error codes.

4. The method of claim 1, wherein discarding the selected portion of image data within a frame determined to have errors under the condition that the image encoding standard is H.263 comprises:

if error codes have been detected in a first GOB of a frame, discarding all data in the whole frame; or if error codes have been detected in a GOB other than the first GOB of a frame, and if a GOB Frame Identification (GFID) of the GOB with error codes is identical with the GFID of a next GOB, discarding data in the GOB with error codes; or if error codes have been detected in a GOB other than the first GOB of a frame, and if the GFID of the GOB with error codes is not identical with the GFID of the next GOB, backwardly searching the next frame header at the receiving end, and discarding all data between a starting position of the GOB with error codes and a starting position of the next frame header.

5. The method of claim 1, further comprising:
   setting a fixed number of Macro-Blocks (MBs) in each frame to an intra-frame encoding mode at the transmitting end, and making said MBs of adjacent frames be adjacent in position on screen.

6. The method of claim 5, wherein the number of MBs which are set to the intra-frame encoding mode in each frame for Common Intermediate Format (CIF) images is three, and the number of MBs which are set to the intra-frame encoding mode in each frame for images with other formats can be proportionally adjusted according to the size of images.

7. The method of claim 1, further comprising:
   making different processing for a more error codes situation and a less error codes situation, and wherein when there is a more error codes situation, a special image is output at the receiving end.

* * * * *